(12) United States Patent
Tanaka et al.

(10) Patent No.: US 7,191,588 B2
(45) Date of Patent: Mar. 20, 2007

(54) COMBUSTOR CONTROLLER

(75) Inventors: Satoshi Tanaka, Takasago (JP);
 Shinsuke Nakamura, Takasago (JP);
 Fuminori Fuji, Takasago (JP); Naoki Ujiie, Takasago (JP); Kozo Toyama, Takasago (JP)

(73) Assignee: Mitsubishi Heavy Industries, Ltd, Tokyo (JP)

( * ) Notice: Subject to any disclaimer, the term of this patent is extended or adjusted under 35 U.S.C. 154(b) by 175 days.

(21) Appl. No.: 10/528,408

(22) PCT Filed: Oct. 9, 2003

(86) PCT No.: PCT/JP03/13013

§ 371 (c)(1),
(2), (4) Date: Mar. 18, 2005

(87) PCT Pub. No.: WO2004/033874

PCT Pub. Date: Apr. 22, 2004

(65) Prior Publication Data

US 2006/0005526 A1 Jan. 12, 2006

(30) Foreign Application Priority Data

Oct. 10, 2002 (JP) .............................. 2002-297400

(51) Int. Cl.
 *F02C 9/28* (2006.01)
 *F02C 9/48* (2006.01)
(52) U.S. Cl. .................... 60/39.27; 60/39.281

(58) Field of Classification Search ............... 60/39.27, 60/39.281, 238, 240, 243
See application file for complete search history.

(56) References Cited

U.S. PATENT DOCUMENTS

| 4,094,142 A | | 6/1978 | Pfefferle |
| 5,533,329 A | * | 7/1996 | Ohyama et al. ............... 60/773 |
| 6,095,793 A | * | 8/2000 | Greeb ........................ 431/12 |
| 2004/0008010 A1 | * | 1/2004 | Ebrahim et al. .............. 322/44 |

FOREIGN PATENT DOCUMENTS

| GB | 2011091 A | 7/1979 |
| JP | 51-98414 A | 8/1976 |
| JP | 54-90409 A | 7/1979 |
| JP | 7-189743 A | 7/1985 |
| JP | 61-96332 A | 5/1986 |
| JP | 5-52174 A | 3/1993 |
| JP | 8-178290 A | 7/1996 |
| JP | 11-22490 A | 1/1999 |

* cited by examiner

*Primary Examiner*—L. J. Casaregola
(74) *Attorney, Agent, or Firm*—Birch, Stewart, Kolasch & Birch, LLP

(57) ABSTRACT

A turbine inlet temperature operating section (15) determines the turbine inlet temperature T4 based on the flow rate Gf and temperature Tf of fuel being supplied to a combustor (3) and the flow rate G3 and temperature T3 of air. Based on the turbine inlet temperature T4, a pilot ratio operating section (16) sets a pilot ratio, and a bypass valve operating section (17) and an IGV opening operating section (18) generate a bypass valve control signal and an IGV control signal, respectively.

12 Claims, 4 Drawing Sheets

COMBUSTOR CONTROLLER

TECHNICAL FIELD

The present invention relates to a combustor controller of a gas turbine, and especially, relates to a combustor controller which controls a fuel-air ratio of fuel and air being supplied to a combustor.

BACKGROUND ART

Conventionally, a combustor which is provided with a pilot nozzle performing diffusion combustion with a pilot light by diffusing fuel gas and a main nozzle performing premixed combustion by mixing air with fuel is employed as a combustor of a gas turbine plant. A gas turbine rotates by utilizing combustion gas from this combustor, and then a generator generates electricity by a motive power of this gas turbine. Consequently, in a power generating facility utilizing a gas turbine, it is possible to control output of a generator by controlling combustion of a combustor.

In controlling combustion of such a combustor as is described above, a fuel ratio of pilot fuel being supplied to the pilot nozzle versus main fuel being supplied to the main nozzle is also controlled. By controlling this fuel ratio to be an appropriate value, it is possible to restrain exhaust amount of NOx. FIG. 6 shows a construction of this conventional combustor controller for controlling a combustor which is equipped with a pilot nozzle and a main nozzle.

A combustor controller 100 in FIG. 6 generates based on an output of a generator 4 a bypass valve control signal, in order to control the opening of a combustor bypass valve 8, which is determined by a bypass valve opening operating section 102, and supplies the signal to a combustor bypass valve 8, so as to control an amount of air being supplied to a combustor 3. Further, this combustor controller 100 generates based on an output of a generator 4 an IGV control signal, in order to control an opening of an inlet guide vane (IGV) 5, which is determined by an IGV opening operation section 103, and supplies the signal to the IVG 5, so as to control an amount of air being supplied to a compressor 1. Here, the bypass valve opening operating section 102 and the IGV opening operating section 103 calculate values of a bypass valve control signal and an IGV control signal based on the graphs in FIG. 3 and FIG. 4. The axes of abscissas in FIG. 3 and FIG. 4 represent an output of a generator.

Further, the combustor controller 100 generates a fuel flow rate instruction signal (CSO) by obtaining a difference between an output of the generator 4 and an aimed generator output in a subtraction section 9 and then adding thereto an integral constituent in PI section 10. When the value of this CSO from the PI section 10 is compared with a predetermined value "L" by using a limiter 11 and is determined to be lower than the predetermined value "L," the CSO's are supplied to a pilot ratio operating section 101 and a multiplication section 12.

In the pilot ratio operating section 101, a multiplication value used in the multiplication section 12 is set in the multiplication section 12 based on CSO so as to be supplied to the multiplication section 12. In the multiplication section 12, the CSO being supplied by a limiter 11 is multiplied by the multiplication value being supplied by the pilot ratio operating section 101, so as to generate a pilot fuel control signal, which is to be supplied to a pilot fuel control valve 7. Additionally, in a subtraction section 13, a pilot fuel control signal being supplied by the multiplication section 12 is subtracted from the CSO being supplied by the limiter 11, so as to generate a main fuel control signal, which is to be supplied to a main fuel control valve 6. Further, in the pilot ratio operating section 101, a value of a pilot fuel control signal is obtained based on a graph in FIG. 2. Moreover, the axis of abscissas in FIG. 2 represents a CSO value.

In a combustor controller 100 constructed as described above, when a load to a gas turbine 2 is low and an output of a generator 4 is low, in order to restrain combustion vibration and achieve stable combustion, an opening of an IGV 5 is closed so as to decrease the flow rate of air flowing into a compressor 1, and an opening of a combustor bypass valve 8 to increase the flow rate of compressed air flowing directly into the gas turbine 2 from the compressor 1. By decreasing the flow rate of air to the combustor 3 in the above-mentioned manner, a fuel-air ratio is increased. Moreover, when a load to a gas turbine 2 is high and an output of the generator 4 is high, in order to restrain a discharge amount of NOx, the flow rate of air flowing into the compressor 1 is increased by opening the IGV and an amount of compressed air flowing directly into the gas turbine 2 from the compressor 1 is decreased by closing the combustor bypass valve 8. By increasing the flow rate of air being supplied to the combustor 3 in the above-mentioned manner, the fuel-air ratio is decreased.

Further, when an output from a generator is low, in order to activate combustion of a pilot nozzle and restrain combustion vibration, thereby achieving stable combustion, a ratio of pilot fuel ("pilot ratio") versus entire fuel being supplied to the combustor 3 is increased by closing the main fuel control valve 6 and opening the pilot fuel control valve 7. Also, when an output from a generator is high, in order to restrain combustion of a pilot nozzle and restrain the exhaust amount of NOx, the pilot ratio is decreased by opening the main fuel control valve 6 and closing the pilot fuel control valve 7.

Conventionally, a thermal energy obtained by combustion is converted to a kinetic energy by a gas turbine 2 and this kinetic energy is converted to an electric energy by a generator 4 in the above-mentioned manner. Also, as described above, the output of the generator 4 shows a state which is close to a combustion state in the combustor 3, and response delay to a change of combustion state in the combustor 3 is small. Consequently, as explained above, conventionally, the pilot ratio and the opening of an IGV 5 and combustor bypass valve 8 are set based on an output from a generator 4.

However, because in a conventional combustor controller, a flow rate of air being supplied to a combustor and a flow rate of fuel being supplied to a pilot nozzle and a main nozzle are set based on an output of a generator, accurate control cannot be performed in a case where a power factor of electricity supply system of a generator is changed or in a case where a compound power generation system using a steam turbine at the same time is subject to a rapid load fluctuation.

Namely, in a case where reactive power is increased, resulting in variation of power factor, proportionality relation between a propulsion torque of a gas turbine obtained by combustion and the generator output is broken because the generator output is measured by effective electric power. At this time, because the generator output becomes small although the propulsion torque of a gas turbine does not vary, such a control is performed as increases the pilot ratio and the fuel-air ratio.

Moreover, in a compound power generation facility where a steam turbine is connected to a gas turbine by way of one shaft, the generator output is equivalent to a total of a propulsion torque of a gas turbine and a propulsion torque of a steam turbine. Therefore, the generator output based on the propulsion torque of a gas turbine is obtained by presuming a propulsion torque of a steam turbine in a steady state, and the pilot ratio and the fuel-air ratio are controlled in the combustor based on the generator output which is equivalent to this obtained propulsion torque of a gas turbine. Consequently, the generator output being equivalent to a propulsion torque of a gas turbine is not obtained accurately, and when a rapid load fluctuation occurs, it is impossible to control the pilot ratio and the fuel-air ratio in the combustor accurately.

In order to prevent the above-mentioned problem, it is preferable to control the pilot ratio and the fuel-air ratio in a combustor by temperature of combustion gas at the outlet of the combustor (i.e. temperature of combustion gas being supplied to the inlet of a gas turbine, which is referred as "turbine inlet temperature" hereafter). However, in recent gas turbines, because the turbine inlet temperature exceeds 1500° C., there exist no temperature-measuring devices which can measure the turbine inlet temperature continuously for a long time. Moreover, although there is a method of presuming the turbine inlet temperature by calculating from the casing pressure of a combustor and exhaust gas temperature of a gas turbine, response of exhaust gas temperature to combustion state is bad. As a result, a delayed value is supplied to the actual turbine inlet temperature, which causes a response delay to occur in controlling the pilot ratio and fuel-air ratio in the combustor.

DISCLOSURE OF THE INVENTION

It is an object of the present invention to provide a combustor controller which can calculate a turbine inlet temperature accurately without response delay and also can control a combustor based on the turbine inlet temperature which results from calculation.

In order to achieve the above-mentioned object, according to the present invention, a combustor controller, which is mounted to a gas turbine being installed by sharing a same shaft of a generator and controls a combustor by supplying combustion gas to the gas turbine so as to rotate it, is provided with:

a fuel flow rate operating section which sets a flow rate of fuel being supplied to the combustor based on a differential value between an output of the generator and an aimed output of the generator;

a turbine inlet temperature operating section which obtains a turbine inlet temperature serving as a temperature of combustion gas flowing from the combustor into the gas turbine, based on the flow rate and the temperature of fuel and air flowing into the combustor, respectively;

a pilot ratio operating section which sets the pilot ratio serving as the ratio of a pilot fuel being supplied to a pilot nozzle inside the combustor and performing diffusion combustion of a pilot light versus entire fuel flow rate, totalizing the pilot fuel and a main fuel being supplied to a main nozzle inside the combustor and performing premixed combustion by mixing air and fuel, based on a turbine inlet temperature obtained by the turbine inlet temperature operating section; and an air flow rate calculation section which sets the flow rate of air flowing into the inside of the combustor, based on the turbine inlet temperature determined by the turbine inlet temperature operating section; and is characterized by:

wherein, flow rates of the pilot fuel and the main fuel are controlled based on the pilot ratio obtained by the pilot ratio operating section and the fuel flow rate obtained by the fuel flow rate operating section; and wherein, combustion state of the combustor is controlled by controlling a flow rate of air flowing into the inside of the combustor by the air flow rate obtained by the air flow rate operating section.

BEST MODE FOR CARRYING OUT OF THE INVENTION

Figure 1:
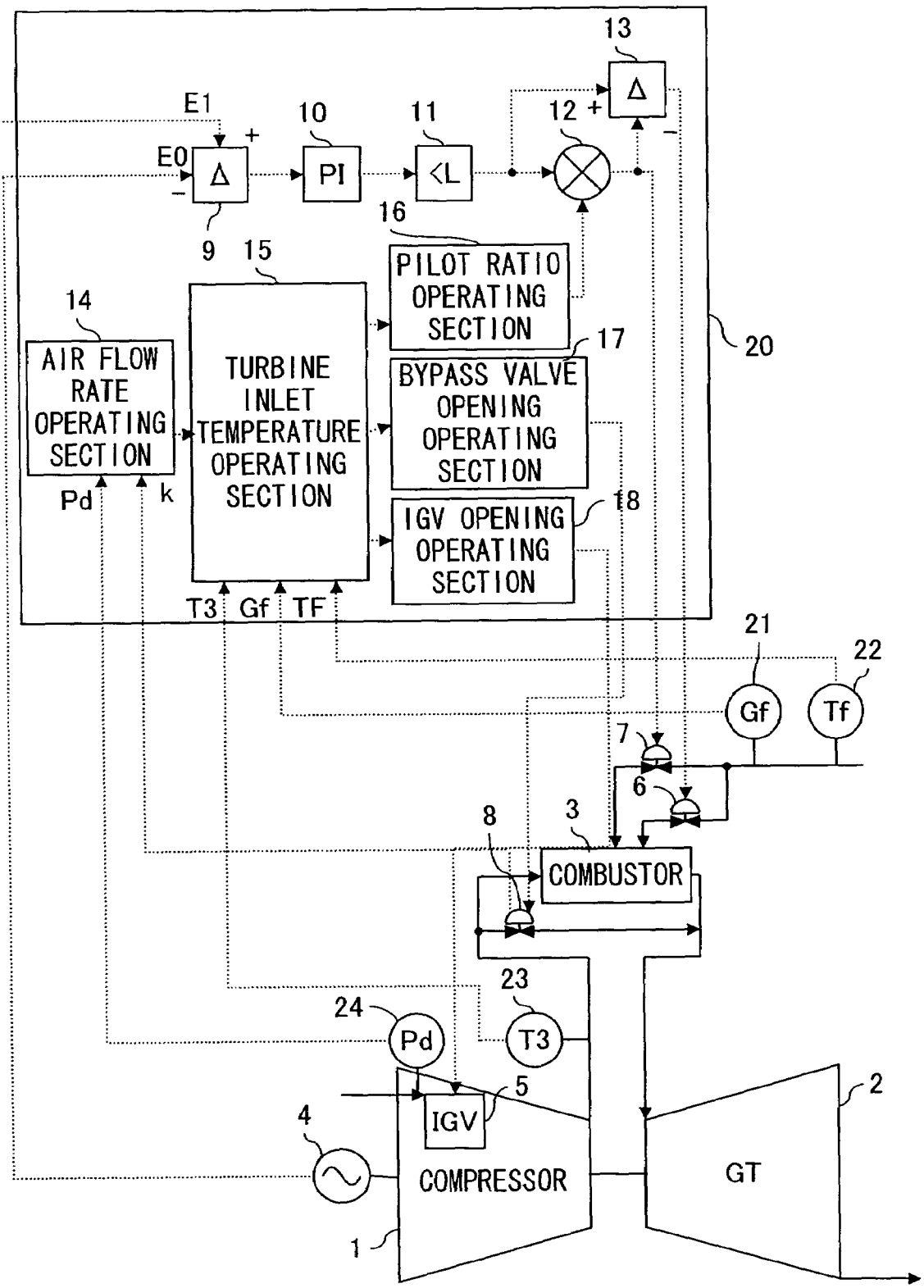
FIG. 1 is a block diagram showing a construction of a gas turbine power generation facility provided with a combustor controller in accordance with an embodiment of the prevent invention.
Figure 6:
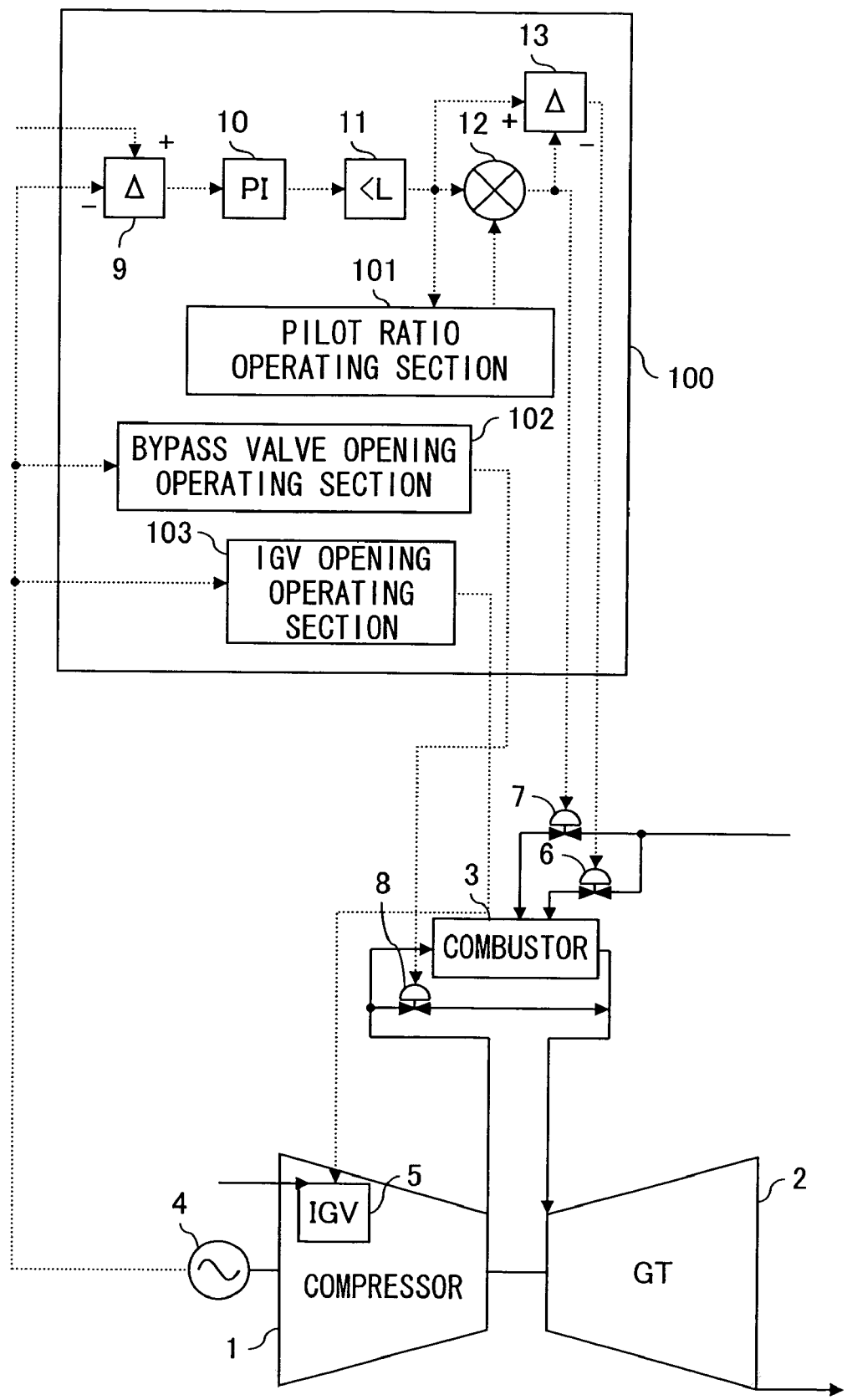
FIG. 6 is a block diagram showing a construction of a conventional gas turbine power generating facility.

Referring now to the drawings, an embodiment of the present invention will be described hereinafter. FIG. 1 is a block diagram showing a construction of a gas turbine power generating facility provided with a combustor controller in accordance with an embodiment of the present invention. Here in FIG. 1, same symbols will be supplied to a same portion as in FIG. 6 and their detailed explanations will be omitted.

A gas turbine power generating facility in FIG. 1 is provided with a compressor 1 equipped with an IGV 5 which serves as a stationary blade in a first stage; a gas turbine 2 which is provided to a same shaft of the compressor 1; a combustor 3 which supplies combustion gas so as to rotate the gas turbine 2; and a generator 4 which is rotated by rotating the gas turbine 2 so as to generate electricity. Additionally, are provided a main fuel control valve 6 which sets a flow rate of fuel being supplied to a main nozzle (not illustrated) of the combustor 3; a pilot fuel control valve 7 which sets a flow rate of fuel being supplied to a pilot nozzle (not illustrated) of the combustor 3; a combustor bypass valve 8 which sets a flow rate of air bypasseing from the compressor 1 to the gas turbine 2 so as to determine a flow rate of air being supplied to the combustor 3; and a combustor controller 20 which controls a fuel-air ratio and pilot ratio of the combustor 3.

Further, in order to measure a fuel flow rate Gf and a fuel temperature Tf of fuel to the combustor 3 respectively, are provided a flow-rate measuring device 21 and a temperature-measuring device 22 that are mounted before a branch connection in a passageway for fuel supply, which supplies fuel to a main nozzle and a pilot nozzle, respectively; a temperature-measuring device 23 which is mounted at the outlet of a compressor 1 so as to measure a temperature T3 of compressed air being discharged from the compressor 1; and a differential-pressure-measuring device 24 which is mounted before and after the IGV 5 of the compressor 1 so as to measure the differential pressure Pd of air flowing into the compressor 1.

When a gas turbine power generation facility is constructed as described above, an amount of air flowing into a compressor 1 is set by an opening of an IGV, and also an amount of air flowing into the combustor 3 from the compressor 1 is set by a combustor bypass valve 8. Then, when air compressed in the compressor 1 is supplied to the combustor 3, not only diffusion combustion is performed by a pilot nozzle to which fuel is supplied by way of a pilot fuel control valve 7, but also premixed combustion is performed by a main nozzle to which fuel is supplied by way of a main fuel control valve 6. In consequence, high temperature combustion gas obtained as a result of burning in the combustor 3 is supplied to a gas turbine 2. When the gas turbine 2 is rotated by combustion gas being supplied by the combustor 3, a generator 4 sharing a same shaft is rotated, too, so that the generator 4 generates electricity and outputs electric power.

At this time, the flow rate Gf of entire fuel being supplied to the combustor 3 is measured by a flow-rate-measuring device 21 and also, the temperature Tf thereof is measured by a temperature-measuring device 22. Additionally, a temperature T3 of air being supplied to the combustor 3 from the compressor 1 is measured by the temperature-measuring device 23. Further, a differential pressure Pd of air flowing into the compressor 1 is measured by a differential-pressure-measuring device 24. Then, the fuel flow rate Gf, fuel temperature Tf, air temperature T3, differential pressure Pd and an opening k of a combustor bypass valve 8 that are measured are provided to the combustor controller 20.

Then, the fuel-air ratio and pilot ratio of a combustor 3 are set by a combustor controller 20, based on the fuel flow rate Gf, fuel temperature Tf, air temperature T3, differential Pd and opening k of a combustor bypass valve 8. Consequently, an IGV control signal, a main fuel control signal, a pilot fuel control signal and a bypass valve control signal, respectively, are generated based on the fuel-air ratio and the pilot ratio that are set, so as to be provided to an IGV 5, a main fuel control valve 6, a pilot fuel control valve 7 and a combustor bypass valve 8.

This combustor controller 20 is provided with: a subtraction section 9 that receives output E0 of a generator 4 and calculates the differential value E1−E0 thereof from an aimed output E1 is obtained; a PI section 10 which generates a CSO by adding an integral constituent to the differential value E1−E0 obtained by the subtraction section 9; a limiter 11 which supplies a CSO serving as "L" when the value of CSO from PI section 10 is larger than "L;" a multiplication section 12 which generates a pilot fuel control signal by being supplied with a CSO from the limiter 11; a subtraction section 13 which generates a main fuel control signal by subtracting a value of a pilot fuel control signal which is supplied by the multiplication section 12 from a value of CSO which is supplied by the limiter 11: an air flow rate operating section 14 which determines a flow rate G3 of air flowing into the combustor 3 based on a differential pressure Pd and an opening k of a combustor bypass valve 8; a turbine inlet temperature operating section 15 which obtains a turbine inlet temperature T4 based on a fuel flow rate Gf, fuel temperature Tf, air flow rate G3 and air temperature T3; a pilot ratio operating section 16 which calculates a pilot ratio based on a turbine inlet temperature T4 so as to be supplied to the multiplication section 12; a bypass valve opening operating section 17 which generates a bypass valve control signal based on a turbine inlet temperature T4; and an IGV opening operating section 18 which generates an IGV control signal based on the turbine inlet temperature T4.

In a combustor controller 20 being constructed as described above, when an output E0 from a generator 4 is supplied to a subtraction section 9, an actual output E0 is subtracted from an aimed output E1 of the generator 4 and a differential value E1−E0 is determined. In order to make responsive characteristic satisfactory for this differential value E1−E0, CSO is generated by having an integral constituent added to a PI section 10 and is supplied to a limiter 11. In the limiter 11, the CSO value is compared with "L," and when the CSO is smaller than "L," CSO is output from the PI section 10 as it is; whereas, CSO being equivalent to "L" is output when the CSO is larger than "L."

Additionally, when a differential pressure Pd between inner pressure and outer pressure of an IGV 5 being measured by a differential-pressure-measuring device 24 and an opening k of a combustor bypass valve 8 are supplied to an air flow rate operating section 14, a flow rate G3 of air being supplied to the combustor 3 from a compressor 1 by way of the combustor bypass valve 8 is obtained. Then, together with the air flow rate G3 determined by this air flow rate operating section 14, a fuel flow rate Gf, a fuel temperature Tf and an air temperature T3 measured by a flow-rate-measuring section 21 and temperature-measuring sections 22 and 23, respectively, are supplied to a turbine inlet temperature operating section 15. In the turbine inlet temperature operating section 15, a turbine inlet temperature T4 is determined based on a transfer function expressed by a formula (2) which is obtained from a formula (1).

$$Cp4\ Vcb\ \gamma 4 \times (dT4/dt) = Cpf\ Gf\ Tf + Cp3\ G3\ T3 + \eta\ Hf\ Gf - Cp4\ G4\ T4 \qquad (1)$$

$$T4(s) = (Cpf\ Gf(s)Tf(s) + Cp3\ G3(s)\ T3(s) + \eta\ Hf\ Gf(s)) / Cp4\ G4(s) + Cp4\ Vcb\ \gamma 4\ s) \qquad (2)$$

Where, Cp3 is a specific heat of a casing of a combustor 3; Cp4 is a specific heat of combustion gas; Cpf is a specific heat of fuel; η is a thermal efficiency of a combustor 3; Hf is a heat quantity of fuel; γ4 is a specific gravity of fuel gas; Vcb is a volume of a combustor; and G4 is a flow rate of turbine inlet combustion gas (=G3+Gf). Further, G3 (s), T3 (s), G4 (s), Gf (s) and Tf (s), respectively, are functions by "s," and each is a function which varies depending on measured values.

Here, the formula (1) expresses a dynamic behavior of turbine inlet temperature; wherein, a first item of a right-hand member represents thermal energy that fuel gas owns; a second item of a right-hand member represents thermal energy that air flowing in owns; a third item of a right-hand member represents thermal energy which is generated by combustion; a fourth item of a right-hand member represents energy which is necessary for combustion gas to be increased to reach current turbine inlet temperature T4; and a left-hand member represents an amount of change of thermal energy due to combustion gas versus an amount of change of the turbine inlet temperature T4, respectively. Consequently, when the right-hand member is positive, it means that energy being supplied by the combustor 3 is higher than an energy necessary to be increased to the current turbine inlet temperature T4. On the other hand, when the right-hand member is negative, it means that an energy supplied by the combustor 3 is lower than an energy necessary to be increased to the current turbine inlet temperature T4.

Figure 2:
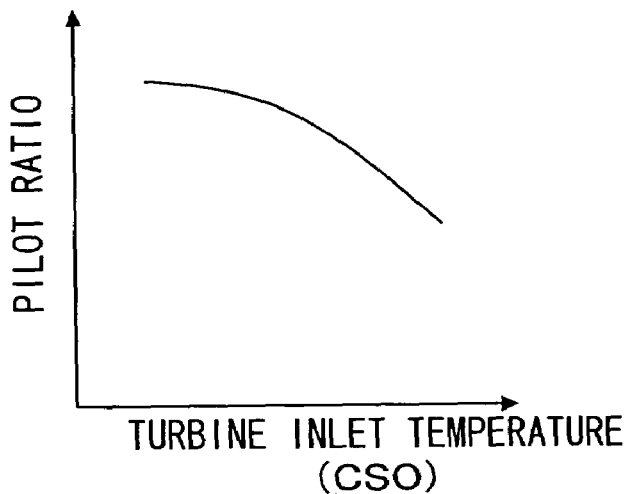
FIG. 2 is a graph showing a relation between a pilot ratio and a turbine inlet temperature or CSO.
Figure 3:
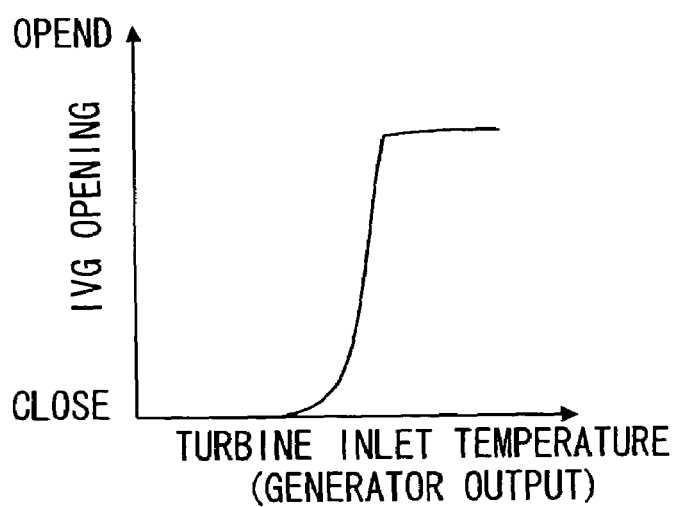
FIG. 3 is a graph showing a relation between an opening of a combustor bypass valve and a turbine inlet temperature or a generator output.
Figure 4:
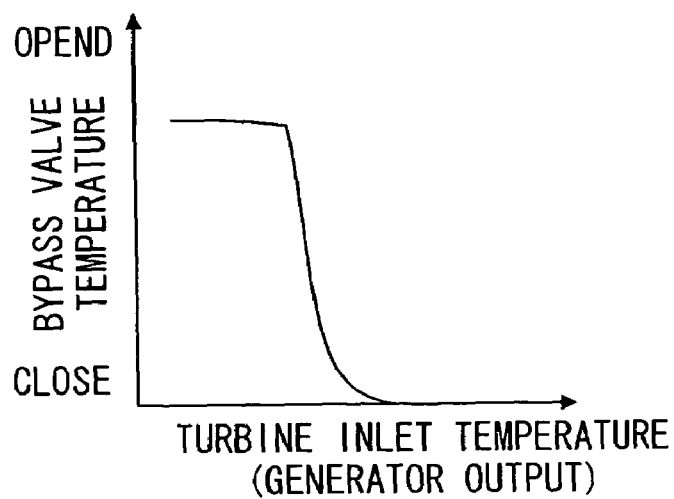
FIG. 4 is a graph showing a relation between an opening of an IVG and a turbine inlet temperature or a generator output.

Value of turbine inlet temperature T4 which is determined in a turbine inlet temperature operating section 15 based on a transfer function of the formula (2) is supplied to a pilot ratio operating section 16, a bypass valve opening operating section 17 and an IGV opening operating section 18. Then, in the pilot ratio operating section 16, a pilot ratio is determined on the basis of FIG. 2 and supplied to a multiplication section 12. Additionally, in the bypass valve opening operating section 17, a bypass valve control signal which is a value based on FIG. 3 is determined so as to be supplied to a combustor bypass valve 8. Moreover, in the IGV opening operating section 18, an IGV control signal which is a value based on FIG. 4 is determined and supplied to the IGV 5. Here, axes of abscissa in FIG. 2 through FIG. 4 represent a turbine inlet temperature T4. In other words, when the turbine inlet temperature T4 becomes high, the pilot ratio becomes small; and when the turbine inlet temperature T4 exceeds a predetermined value, a change is made not only to close the combustor bypass valve 8 but also to open the IVG 5.

A pilot ratio determined by the pilot ratio operating section 16 in the above-mentioned manner is supplied to the multiplication section 12; and in the multiplication section 12, the pilot ratio is multiplied by CSO that is supplied by the limiter 11. Now, when the pilot ratio is P, a pilot fuel control signal which equals to a value of P×CSO is output from the multiplication section 12 and supplied to a subtraction section 13 and a pilot fuel control valve 7. Because this pilot fuel control signal is supplied to the subtraction section 13, by subtracting the pilot fuel control signal from CSO supplied by the limiter 11 in the subtraction section 13, a main fuel control signal which is equivalent to (1−P)×CSO is calculated from the subtraction section 12 and supplied to the main fuel control valve 6.

By having the combustion controller 20 perform in the above-mentioned manner, it is possible to control combustion state of a combustor 3 based on the turbine inlet temperature T4. In other words, when the turbine inlet temperature T4 is high, by opening the IVG 5 as well as by closing the combustor bypass valve 8, the flow rate of air flowing into the combustor 3 is increased, thereby reducing the fuel-air ratio; and moreover, by opening the main fuel control valve 6 as well as by closing the pilot fuel control valve 7, the pilot ratio can be reduced, so as to restrain an amount of exhaust of NOx which is generated at a high load time.

Also, when the turbine inlet temperature T4 is low, by not only closing the IVG 5 but also by opening the combustor bypass valve 8, it is possible to increase the flow rate of air flowing into the combustor 3 so as to increase the fuel-air ratio; and additionally, by not only closing the main fuel control valve 6 but also by opening the pilot fuel control valve 7, it is possible to increase the pilot ratio so as to restrain combustion vibration generating at a time of low load and achieve stable combustion.

Figure 5:
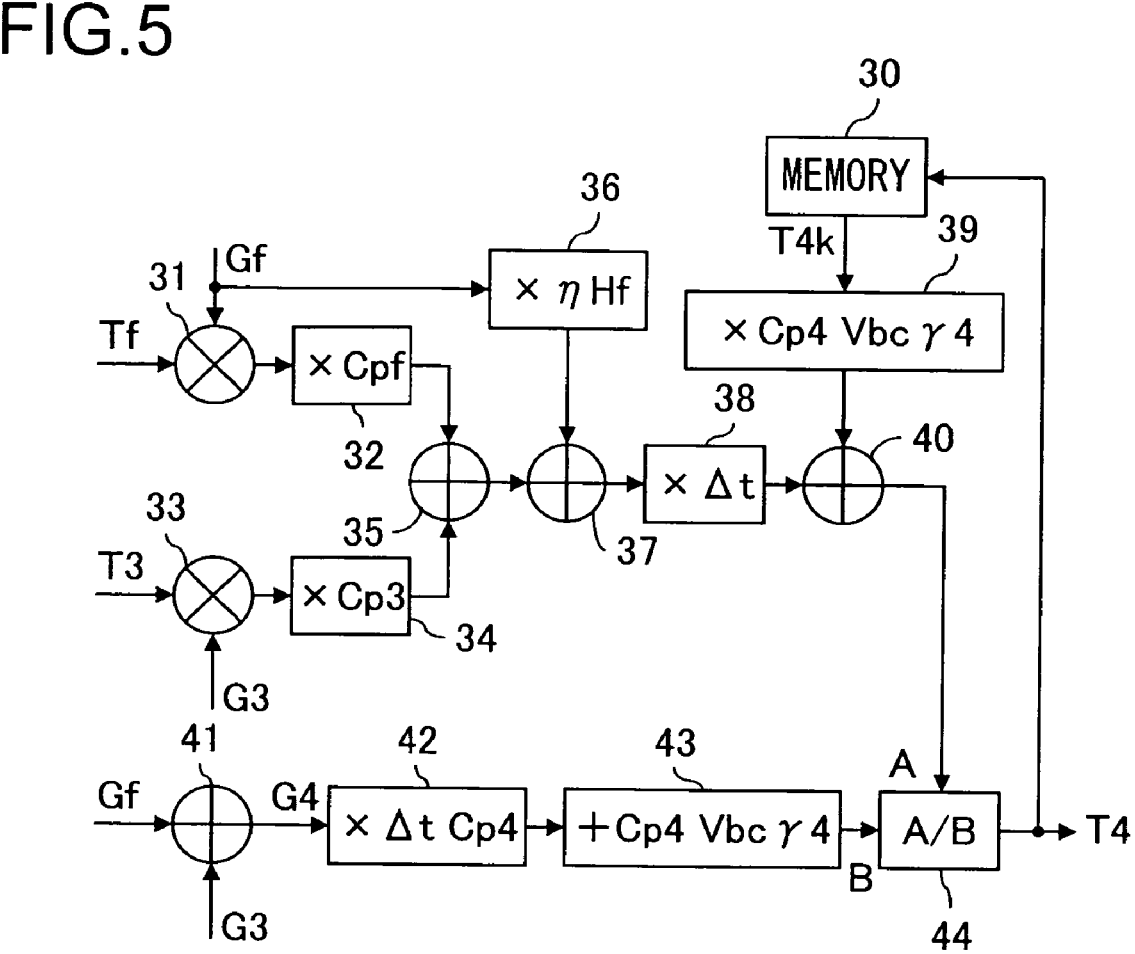
FIG. 5 is a diagram depicting an example of a inner construction of a turbine inlet temperature operating section.

Further, in an embodiment in accordance with the present invention, a turbine inlet temperature T4 is determined based on a transfer function in the formula (2) in a turbine inlet temperature operating section 15. However, for example, a construction shown in FIG. 5 may be employed. The turbine inlet temperature operating section 15 shown in FIG. 5 is so constructed as to be based on a formula (3) below. Here, in the formula (3), T4 is a present turbine inlet temperature; T4$k$ is a turbine inlet temperature resulting from a previous calculation; Δt is a timing when measured values are supplied by measuring sections 22 through 24, respectively. In addition, the present turbine inlet temperature T4 is expressed as a formula (4) by the formula (3).

$$Cp4\ Vcb\gamma 4\times (T4-T4k)/\Delta t = Cpf\ Gf\ Tf + Cp3\ G3\ T3 + \eta\ Hf\ Gf - Cp4\ G4\ T4 \quad (3)$$

$$T4 = ((Cpf\ Gf\ Tf + Cp3\ G3\ T3 + \eta\ Hf\ Gf)\times \Delta t + Cp4\ Vcb\gamma 4\times T4k)/(\Delta t\ Cp4\ G4 + Cp4\ Vcb\gamma 4) \quad (4)$$

In FIG. 5, after fuel temperature Tf and fuel flow rate Gf are multiplied in the multiplication section 31, fuel specific heat Cpf serving as a constant is multiplied in the multiplication section 32; and also, after air temperature T3 and air flow rate G3 are multiplied in the multiplication section 33, specific heat of casing Cp3 of the combustor 3 serving as a constant is multiplied in the multiplication section 34. Further, fuel flow rate Gf is multiplied by a value η×Hf which is multiplied by heat efficiency η and heat quantity of fuel Hf of the combustor 3 serving as constants in the multiplication section 36. Then, after values obtained by the multiplication sections 32 and 34 are added in the addition section 35, the value determined by this addition section 35 and the value determined by the multiplication portion 36 are added in the addition section 37.

Value (Cpf Gf Tf+Cp3 G3 T3+η Hf Gf) supplied by the addition section 37 as described above is multiplied by timing Δt serving as a constant in the multiplication section 38. Moreover, a memory 30 accommodates a turbine inlet temperature T4$k$ resulting from the previous calculation, and when this turbine inlet temperature T4$k$ is supplied to the multiplication section 39, specific heat Cp4 of fuel gas serving as a constant, volume Vcb of a combustor 3 and specific gravity γ4 of combustion gas are multiplied. Further, in the addition section 40, value (Cpf Gf Tf+Cp3 G3 T3+η Hf Gf)×Δt determined by the multiplication section 38 is added to a value determined by the multiplication section 39.

Moreover, after in the addition section 41 fuel flow rate Gf and air flow rate G3 are added so that turbine inlet combustion gas flow rate G4 is determined, this turbine inlet combustion gas flow rate G4 is multiplied by a value of timing Δt serving as a constant multiplied by specific heat Cp4 of combustion gas in the multiplication section 42. And, further, in the addition section 43, multiplication value of specific heat Cp4 of fuel gas serving as a constant, a volume Vcb of the combustor 3 and specific gravity γ4 of combustion gas is added to a value determined by the multiplication section 42.

When a value A=((Cpf Gf Tf+Cp3 G3 T3+η Hf Gf)×Δt+Cp4 Vcb γ4×T4$k$) determined by an adder 40 and a value B=(Δt Cp4 G4+Cp4 Vcb γ4) determined by the addition section 43 are supplied to the subtraction section 44, A/B is calculated so as to determine the present turbine inlet temperature T4. Then, the determined turbine inlet temperature T4 is supplied to a pilot ratio operating section 16, a bypass valve opening operating section 17 and an IGV opening operating section 18, respectively, and is housed in the memory 30 as a turbine inlet temperature T4$k$.

Here, a turbine inlet temperature operating section 15 is not limited to an example of construction as shown in FIG. 5, but may be constructed in other manners as long as the turbine inlet temperature T4 can be determined based on a function in the formula (1). Additionally, flow rate G3 of air being supplied to a combustor 3 is determined based on a differential pressure Pd of air flowing into a compressor 1 and an opening k of a combustor bypass valve 8, but it may be measured directly by a flow-meter which is installed to a passageway for supplying air to the combustor 3.

INDUSTRIAL APPLICABILITY

As described above, with embodiments of the present invention, because in a turbine inlet temperature operating section, it is possible to determine a turbine inlet temperature based on flow rate and temperature of fuel and air, respectively, being supplied to a combustor, it is possible to determine a turbine inlet temperature which is relatively close to actual temperature. Additionally, because combustion state of a combustor is controlled based on this turbine inlet temperature, it is possible to make a response thereof better. Moreover, different from conventional manner, because combustion state of a combustor is not controlled based on a generator output, it is possible to control combustion state so as to always maintain it to be an optimum combustion state, irrespective of disturbance of electric power system and a change in state of a steam turbine being mounted to a same shaft of a gas turbine.

What is claimed is:

1. A combustor controller controlling a combustor, which is mounted to a gas turbine being installed to a same shaft of a generator, and supplying the relevant gas turbine with combustion gas so as to rotate it, comprising:
    a fuel flow rate operating section which sets a flow rate of fuel being supplied to said combustor based on a differential value between an output of said generator and an aimed output of said generator;
    a turbine inlet temperature operating section which determines a turbine inlet temperature serving as a temperature of combustion gas flowing into said gas turbine from said combustor based on a flow rate and a temperature of fuel and air, respectively, flowing into said combustor;
    a pilot ratio operating section which sets a pilot ratio serving as a ratio of a pilot fuel, being supplied to a pilot nozzle inside said combustor that performs diffusion combustion of a pilot light, versus entire fuel flow rate serving as a total of said pilot fuel and a main fuel, being supplied to a main nozzle inside said combustor that performs premixed combustion by mixing air and fuel, based on a turbine inlet temperature determined by said turbine inlet temperature operating section; and
    an air flow rate operating section which sets a flow rate of air flowing inside said combustor based on a turbine inlet temperature determined by said turbine inlet temperature operating section;
    and is characterized by:
    wherein, flow rates of said pilot fuel and said main fuel are controlled based on a pilot ratio determined by said pilot ratio operating section and said fuel flow rate determined by said fuel flow rate operating section; and
    wherein, combustion state of said combustor is controlled by controlling a flow rate of air flowing into inside of said combustor by air flow rate determined by said air flow rate operating section.

2. A combustor controller as described in claim 1 is characterized by:
    wherein, a pilot ratio calculated by said pilot ratio operating section is multiplied by a fuel flow rate determined by said fuel flow rate operating section so as to determine said flow rate of pilot fuel to said pilot nozzle;
    wherein, said flow rate of main fuel to said main nozzle is determined by subtracting said flow rate of pilot fuel from said flow rate of fuel determined by said fuel flow rate operating section; and
    wherein, flow rates of said pilot fuel and said main fuel are controlled by controlling openings of a pilot fuel control valve and a main fuel valve, respectively, based on said flow rates of pilot fuel and main fuel that are determined.

3. A combustor controller as described in claim 1 is characterized by:
    wherein, when air compressed by a compressor sharing a same shaft of said gas turbine is supplied to said combustor, an opening of an inlet guide vane being installed to said compressor and an opening of a combustor bypass valve being mounted to a passageway for supplying compressed air to said gas turbine, diverged from a passageway for supplying compressed air to said combustor from said compressor are controlled based on said flow rate of air determined by said air flow rate operating section.

4. A combustor controller as described in claim 3 is characterized by:
    wherein, a value of a flow rate of air being supplied to said combustor, which is to be supplied to said turbine inlet temperature operating section, is determined based on a differential pressure at an inlet of said compressor and an opening of said combustor bypass valve.

5. A combustor controller as described in claim 1 is characterized by:
    wherein, said fuel flow rate operating section comprising a subtraction section which determines a differential value between an output of said generator and an aimed output of said generator; and a flow-rate setting portion which sets a flow rate of fuel to said combustor based on a value determined by said subtraction section;
    wherein, when said flow rate of fuel being set by said flow-rate setting section is more than a predetermined threshold, said predetermined threshold is specified as said flow rate of fuel so as to be supplied.

6. A combustor controller as described in claim 1 is characterized by:
    wherein, when said turbine inlet temperature determined by said turbine inlet temperature operating section is low, said pilot ratio determined by said pilot ratio operating section is high, and air flow rate to be determined by said air flow rate operating section will be increased; and
    wherein, further, when said turbine inlet temperature determined by said turbine inlet temperature operating section is high, said pilot ratio to be determined by said pilot ratio operating section is low, and air flow rate determined by said air flow rate operating section will be decreased.

7. A combustor controller as described in claim 1 is characterized by:
    wherein, in said turbine inlet temperature operating section, said turbine inlet temperature T4 is determined by:

$$Cp4 \; Vcb\gamma 4 \times (dT4/dt) = Cpf \; Gf \; Tf + Cp3 \; G3 \; T3 + \eta Hf \; Gf - Cp4 \; G4 \; T4$$

where,
  Gf: Flow rate of fuel to be supplied to said combustor
  Tf: Temperature of fuel to be supplied to said combustor
  G3: Flow rate of air to be supplied to said combustor
  T3: Temperature of air to be supplied to said combustor
  Cp3: Specific heat of casing of said combustor
  Cp4: Specific heat of combustion gas generated in said combustor Cpf: Specific heat of said fuel
η: Thermal efficiency of said combustor
Hf: Heat quantity of said fuel
γ4: Specific gravity of said combustion gas
Vcb: Volume of said combuistor
G4: Flow rate of turbine inlet combustion gas (=G3+Gf).

8. A combustor controller as described in claim 2 is characterized by:
wherein, in said turbine inlet temperature operating section, said turbine inlet temperature T4 is determined by:

$$Cp4\ Vcb\gamma 4\times(dT4/dt)=Cpf\ Gf\ Tf+Cp3\ G3\ T3+\eta Hf\ Gf-Cp4\ G4\ T4$$

where,
Gf: Flow rate of fuel to be supplied to said combustor
Tf: Temperature of fuel to be supplied to said combustor
G3: Flow rate of air to be supplied to said combustor
T3: Temperature of air to be supplied to said combustor
Cp3: Specific heat of casing of said combustor
Cp4: Specific heat of combustion gas generated in said combustor
Cpf: Specific heat of said fuel
η: Thermal efficiency of said combustor
Hf: Heat quantity of said fuel
γ4: Specific gravity of said combustion gas
Vcb: Volume of said combuistor
G4: Flow rate of turbine inlet combustion gas (=G3+Gf).

9. A combustor controller as described in claim 3 is characterized by:
wherein, in said turbine inlet temperature operating section, said turbine inlet temperature T4 is determined by:

$$Cp4\ Vcb\gamma 4\times(dT4/dt)=Cpf\ Gf\ Tf+Cp3\ G3\ T3+\eta Hf\ Gf-Cp4\ G4\ T4$$

where,
Gf: Flow rate of fuel to be supplied to said combustor
Tf: Temperature of fuel to be supplied to said combustor
G3: Flow rate of air to be supplied to said combustor
T3: Temperature of air to be supplied to said combustor
Cp3: Specific heat of casing of said combustor
Cp4: Specific heat of combustion gas generated in said combustor
Cpf: Specific heat of said fuel
η: Thermal efficiency of said combustor
Hf: Heat quantity of said fuel
γ4: Specific gravity of said combustion gas
Vcb: Volume of said combuistor
G4: Flow rate of turbine inlet combustion gas (=G3+Gf).

10. A combustor controller as described in claim 4 is characterized by:
wherein, in said turbine inlet temperature operating section, said turbine inlet temperature T4 is determined by:

$$Cp4\ Vcb\gamma 4\times(dT4/dt)=Cpf\ Gf\ Tf+Cp3\ G3\ T3+\eta Hf\ Gf-Cp4\ G4\ T4$$

where,
Gf: Flow rate of fuel to be supplied to said combustor
Tf: Temperature of fuel to be supplied to said combustor
G3: Flow rate of air to be supplied to said combustor
T3: Temperature of air to be supplied to said combustor
Cp3: Specific heat of casing of said combustor
Cp4: Specific heat of combustion gas generated in said combustor
Cpf: Specific heat of said fuel
η: Thermal efficiency of said combustor
Hf: Heat quantity of said fuel
γ4: Specific gravity of said combustion gas
Vcb: Volume of said combuistor
G4: Flow rate of turbine inlet combustion gas (=G3+Gf).

11. A combustor controller as described in claim 5 is characterized by:
wherein, in said turbine inlet temperature operating section, said turbine inlet temperature T4 is determined by:

$$Cp4\ Vcb\gamma 4\times(dT4/dt)=Cpf\ Gf\ Tf+Cp3\ G3\ T3+\eta Hf\ Gf-Cp4\ G4\ T4$$

where,
Gf: Flow rate of fuel to be supplied to said combustor
Tf: Temperature of fuel to be supplied to said combustor
G3: Flow rate of air to be supplied to said combustor
T3: Temperature of air to be supplied to said combustor
Cp3: Specific heat of casing of said combustor
Cp4: Specific heat of combustion gas generated in said combustor
Cpf: Specific heat of said fuel
η: Thermal efficiency of said combustor
Hf: Heat quantity of said fuel
γ4: Specific gravity of said combustion gas
Vcb: Volume of said combuistor
G4: Flow rate of turbine inlet combustion gas (=G3+Gf).

12. A combustor controller as described in claim 6 is characterized by:
wherein, in said turbine inlet temperature operating section, said turbine inlet temperature T4 is determined by:

$$Cp4\ Vcb\gamma 4\times(dT4/dt)=Cpf\ Gf\ Tf+Cp3\ G3\ T3+\eta Hf\ Gf-Cp4\ G4\ T4$$

where,
Gf: Flow rate of fuel to be supplied to said combustor
Tf: Temperature of fuel to be supplied to said combustor
G3: Flow rate of air to be supplied to said combustor
T3: Temperature of air to be supplied to said combustor
Cp3: Specific heat of casing of said combustor
Cp4: Specific heat of combustion gas generated in said combustor
Cpf: Specific heat of said fuel
η: Thermal efficiency of said combustor
Hf: Heat quantity of said fuel
γ4: Specific gravity of said combustion gas
Vcb: Volume of said combuistor
G4: Flow rate of turbine inlet combustion gas (=G3+Gf).

* * * * *